United States Patent
Watanabe et al.

(10) Patent No.: US 11,788,191 B2
(45) Date of Patent: Oct. 17, 2023

(54) HIGH-DESIGN SLIDING MEMBER

(71) Applicant: NISSAN MOTOR CO., LTD., Yokohama (JP)

(72) Inventors: Satoshi Watanabe, Kanagawa (JP); Soichiro Sugawara, Kanagawa (JP); Ikuo Konno, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 974 days.

(21) Appl. No.: 16/488,727

(22) PCT Filed: Mar. 3, 2017

(86) PCT No.: PCT/JP2017/008627
§ 371 (c)(1),
(2) Date: Aug. 26, 2019

(87) PCT Pub. No.: WO2018/158959
PCT Pub. Date: Sep. 7, 2018

(65) Prior Publication Data
US 2021/0130961 A1    May 6, 2021

(51) Int. Cl.
| | |
|---|---|
| *C23C 22/48* | (2006.01) |
| *C23C 22/83* | (2006.01) |
| *C25D 5/34* | (2006.01) |
| *F16C 33/20* | (2006.01) |
| *C25D 3/22* | (2006.01) |
| *C23C 22/53* | (2006.01) |

(52) U.S. Cl.
CPC ............. *C23C 22/48* (2013.01); *C23C 22/53* (2013.01); *C23C 22/83* (2013.01); *C25D 3/22* (2013.01); *C25D 5/34* (2013.01); *F16C 33/203* (2013.01); *F16C 33/208* (2013.01); *C23C 2222/10* (2013.01); *F16C 2204/50* (2013.01); *F16C 2223/70* (2013.01); *F16C 2240/64* (2013.01); *Y10T 428/12549* (2015.01)

(58) Field of Classification Search
None
See application file for complete search history.

(56) References Cited

U.S. PATENT DOCUMENTS

2010/0230009 A1* 9/2010 Oshima ................... C23C 22/47
148/252

FOREIGN PATENT DOCUMENTS

| EP | 1 318 214 A1 | 6/2003 |
|---|---|---|
| JP | 6-57441 A | 3/1994 |

(Continued)

*Primary Examiner* — Xiaobei Wang
(74) *Attorney, Agent, or Firm* — Foley & Lardner LLP

(57) ABSTRACT

A sliding member includes, on a surface of a metal substrate, a surface-treated layer including a zinc-electroplated layer, a chemical conversion-treated layer, and a topcoat layer sequentially stacked on the metal substrate. The chemical conversion-treated layer includes chromium and oxygen. The topcoat layer includes at least one material selected from the group consisting of a silica compound, acrylic resin, polyurethane resin, epoxy resin, phenol resin, and melamine resin. A method of manufacturing the sliding member includes a step of forming, on a surface of the chemical conversion-treated layer, the topcoat layer including at least one material selected from the group consisting of a silica compound, acrylic resin, polyurethane resin, epoxy resin, phenol resin, and melamine resin.

7 Claims, 3 Drawing Sheets

(56) References Cited

FOREIGN PATENT DOCUMENTS

| | | | |
|---|---|---|---|
| JP | 7-305180 | A | 11/1995 |
| JP | 10-18078 | A | 1/1998 |
| JP | 2002-60962 | A | 2/2002 |
| JP | 2003-261825 | A | 9/2003 |
| JP | 2013-032571 | A | 2/2013 |

* cited by examiner

HIGH-DESIGN SLIDING MEMBER

TECHNICAL FIELD

The present invention relates to sliding members including zinc-plated layers subjected to chemical conversion treatment, and more particularly, to a high-gloss metallic sliding member with less tinge of yellow or red.

BACKGROUND ART

Zinc plating is widely used for preventing corrosion of iron.

Zing plating has a function as a sacrificial coating for a metal substrate containing iron, for example. Zinc dissolves itself so as to prevent corrosion of the metal substrate. However, white rust occurs on the surface of the zinc plating in air relatively for a short period of time to degrade glossiness.

Recent zinc plating includes chemical conversion treatment using chromic acid to prevent white rust described above, and prevents both a cause of white rust and dissolution of zinc due to the synergistic effects of the zinc plating and the chemical conversion-treated layer, so as to protect against corrosion of the metal substrate including iron, and keep glossiness on the surface of the plated layer.

However, the chemical conversion treatment leads to an interference color on the zinc-plated surface to cause color irregularity, which is not desirable to a member such as a component for a vehicle, architectural hardware, and a mechanical component, which are required to have a high-design appearance.

For a sliding member required to a have high-design appearance, plating containing nickel (Ni) is typically used.

Japanese Unexamined Patent Application Publication No. 2013-32571 (Patent Document 1) discloses a sliding member including, on a surface of a metallic substrate, a zinc alloy-plated film including nickel and molybdenum and having a black-colored appearance.

CITATION LIST

Patent Literature

Patent Document 1: Japanese Unexamined Patent Application Publication No. 2013-32571

SUMMARY OF INVENTION

Technical Problem

The zinc alloy-plated film disclosed in Patent Document 1 is costly to manufacture, since the plated layer includes an alloy containing metal, such as nickel, other than zinc.

Further, the product disclosed in Patent Document 1 cannot be manufactured using a conventional zinc-plating production line, and thus has less versatility.

To solve the conventional problems described above, the present invention provides a high-design sliding member having high metallic glossiness and using low-cost zinc plating while avoiding an interference color.

The present invention also provides a method of manufacturing a versatile sliding member manufactured with a conventional zinc-plating production line without being greatly modified.

Solution to Problem

The inventors of the present embodiment devoted themselves to continuous studies to achieve the object described above, so as to accomplish the objects described above and complete the present embodiment by forming a topcoat layer, on a zinc-plated surface subjected to chemical conversion treatment, including at least one material selected from the group consisting of a silica compound, acrylic resin, polyurethane resin, epoxy resin, phenol resin, and melamine resin, so as to increase glossiness while decreasing an interference color caused in a chemical conversion-treated layer, and greatly improve corrosion resistance and sliding performance.

The present embodiment provides a sliding member including, on a surface of a metal substrate, a surface-treated layer including a zinc-electroplated layer, a chemical conversion-treated layer, and a topcoat layer sequentially stacked on the metal substrate, the chemical conversion-treated layer including chromium and oxygen.

The topcoat layer is a clear layer made of at least one material selected from the group consisting of a silica compound, acrylic resin, polyurethane resin, epoxy resin, phenol resin, and melamine resin. . A value of $L^*$ is 85 or greater, a value of $|a^*|$ is smaller than 6, a value of $|b^*|$ is smaller than 8, and a level of metallic gloss is 170 or greater on a surface of the sliding member according to a $L^*a^*b^*$ color system.

The present embodiment also provides a method of manufacturing a sliding member including, on a surface of a metal substrate, a surface-treated layer including a zinc-plated layer, a chemical conversion-treated layer, and a topcoat layer sequentially stacked on the metal substrate, the chemical conversion-treated layer including chromium and oxygen. The topcoat layer is a clear layer made of at least one material selected from the group consisting of a silica compound, acrylic resin, polyurethane resin, epoxy resin, phenol resin, and melamine resin. A value of $L^*$ is 85 or greater, a value of $|a^*|$ is smaller than 6, a value of $|b^*|$ is smaller than 8, and a level of metallic gloss is 170 or greater on a surface of the sliding member according to a $L^*a^*b^*$ color system.

The method includes a step of forming, on a surface of the chemical conversion-treated layer, the topcoat layer.

Advantageous Effects of Invention

According to the disclosure, the topcoat layer made of at least one material selected from the group consisting of a silica compound, acrylic resin, polyurethane resin, epoxy resin, phenol resin, and melamine resin, is formed on the zinc-plated surface subjected to chemical conversion treatment, so as to provide a high-gloss sliding member with less interference color caused in the chemical conversion-treated layer.

According to the disclosure, the method includes the step of forming, on the zinc-plated surface subjected to chemical conversion treatment, the topcoat layer made of at least one material selected from the group consisting of a silica compound, acrylic resin, polyurethane resin, epoxy resin, phenol resin, and melamine resin, so as to provide a versatile sliding member manufactured with a conventional zinc-plating production line without being greatly modified.

DESCRIPTION OF EMBODIMENTS

A sliding member according to the present embodiment will be described in detail below.

Figure 1:
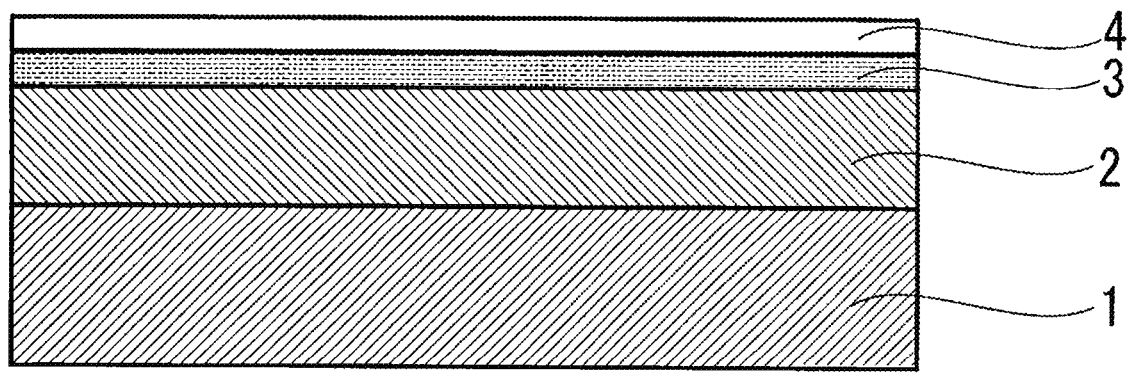
FIG. 1 is a view illustrating a layer structure of a sliding member according to the present embodiment.

The sliding member includes a surface-treated layer on a surface of a metal substrate. The surface-treated layer is provided with a topcoat layer made of at least one material selected from the group consisting of a silica compound, acrylic resin, polyurethane resin, epoxy resin, phenol resin, and melamine resin, on a zinc-plated surface subjected to chemical conversion treatment. As shown in FIG. 1, the surface-treated layer includes a zinc-plated layer 2, a chemical conversion-treated layer 3, and the topcoat layer 4 sequentially stacked on the metal substrate.

<Topcoat Layer>

The topcoat layer is made of at least one material selected from the group consisting of a silica compound, acrylic resin, polyurethane resin, epoxy resin, phenol resin, and melamine resin (hereinafter also referred to as a "topcoat layer composition"), and is a clear layer coating the zinc-plated surface subjected to chemical conversion treatment.

The transparency of the topcoat layer leads to metallic glossiness and cancels out an interference color or color irregularity of the chemical conversion-treated layer, since light passing through the topcoat layer reflects from the chemical conversion-treated layer, so as to achieve a silver-colored high-design appearance while suppressing coloration, in which, according to the L*a*b* color system, a value of L* is 85 or greater, a value of |a*| is smaller than 6, a value of |b*| is smaller than 8, and a level of metallic gloss is 170 or greater.

As used herein, the term "transparent" means that light transmittance of visible light with wavelengths from 380 nm to 780 nm is 70% or greater.

The reason for the glossy silver-colored appearance obtained due to the arrangement of the topcoat layer is not clear, but is presumed to be that an interference color caused by the chemical conversion-treated layer is suppressed, and light specularly reflected from the zinc-plated surface is dominant.

The applied amount of the topcoat layer is preferably in a range of 0.3 mg/m$^2$ or greater and 8.0 mg/m$^2$ or less, and more preferably in a range of 0.3 mg/m$^2$ to 3.5 mg/m$^2$.

The applied amount of less than 0.3 mg/m$^2$ cannot completely cover the chemical conversion-treated layer, and may cause damage to the topcoat layer.

As the applied amount of the topcoat layer is increased, the corrosion resistance can be increased, when the sliding member needs to have higher corrosion resistance. However, the applied amount exceeding 8.0 mg/m$^2$ may cause overgrown crystals in a white powder state depending on the silica compound used, leading to degradation in metallic glossiness with the passage of time.

The applied amount of the topcoat layer may be measured such that the topcoat layer deposited on the sliding member is removed so as to calculate the weight per unit area.

The topcoat layer composition included in the topcoat layer can be any material that has high adhesion to the chemical conversion-treated layer and high transparency, and can block moisture and oxygen. The topcoat layer composition can be a silica compound, in addition to the above resin components such as acrylic resin, polyurethane resin, epoxy resin, phenol resin, and melamine resin. Examples of such silica compounds include silica and silicate. The topcoat layer composition may include one of these components or may include more than one so as to be combined together.

The topcoat layer composition including a silica compound has high smoothing properties and decreases sliding resistance, and is thus appropriate for the use of a sliding member, such as a headrest stay for a vehicle, to which a lubricant cannot be applied.

The topcoat layer composition is preferably soluble or dispersible in water. The aqueous topcoat layer composition eliminates the use of an oleaginous solvent, so as to form the topcoat layer continuously after the formation of the zinc-plated layer. This facilitates the treatment without a conventional zinc-plating production line being greatly modified.

The topcoat layer may be formed by the step of applying an aqueous topcoat layer-coating liquid containing the topcoat layer composition described above and then drying it.

<Chemical Conversion-Treated Layer>

The chemical conversion-treated layer includes chromium (Cr) and oxygen (O) and is a film is formed on the zinc plating, so as to prevent white rust of the zinc plating and retard red rust caused in the metal substrate.

The thickness of the chemical conversion-treated layer is preferably in a range of 50 nm to 300 nm. Setting the thickness of the chemical conversion-treated layer in the above range can achieve a silver-colored glossy appearance together with the effects of the topcoat layer.

The chemical conversion-treated layer with a thickness of less than 50 nm may have low corrosion resistance and tends to easily cause red rust, leading to a degrade high-design appearance. The chemical conversion-treated layer with a thickness exceeding 300 nm may increase an interference color and tends to be tinged with yellow or red, preventing the interference color or color irregularity from being canceled out by the topcoat layer.

The thickness of the chemical conversion-treated layer may be measured such that an image of the surface-treated layer in cross section is captured.

The chemical conversion-treated layer may be formed such that the zinc-plated metal substrate is impregnated in a chemical conversion treatment liquid mainly containing trivalent chromic acid or dichromate.

The chemical conversion-treated layer using a chromate liquid mainly containing trivalent chromium has lower self-restoring performance and corrosion resistance than a chemical conversion-treated layer mainly containing hexavalent chromium, but can sufficiently keep the glossy appearance for a long period of time since the corrosion resistance is improved due to the presence of the topcoat layer.

<Zinc-Plated Layer>

The zinc-plated layer protects the metal substrate against corrosion due to its sacrificially self-corroding function. The zinc-plated layer according to the present embodiment may be any plated layer that has a metallic glossy appearance, and is preferably a zinc-electroplated layer which contributes to less surface roughness and facilitates a high glossy appearance.

A thickness of the zinc-plated layer is preferably 3 μm or greater. The thickness of 3 μm or greater improves the corrosion resistance. In contrast, the excessively-reduced thickness of the zinc-plated layer wears out the zinc plating relatively soon because of its sacrificially self-corroding function, reducing the corrosion resistance.

The zinc electroplating uses metal ions in the plating liquid and stacks plating metal on the surface of the metal substrate at an atomic level by electrical energy so as to form the layer. Since the thickness increased by the electroplating is limited to a certain extent, the practical upper limit of the thickness increased by the electroplating is about 20 μm.

The thickness of the zinc-plated layer may be measured such that an image of the surface-treated layer in cross section is captured.

<Metal Substrate>

The metal substrate can include metal which is nobler than zinc, and is preferably an iron-based metal substrate such as a steel material.

<Method of Manufacturing Sliding Member>

The sliding member described above can be manufactured such that the surface-treated layer is stacked on the surface of the metal substrate processed into a product state. A method of manufacturing the sliding member according to the present embodiment includes a step of forming the topcoat layer on the sliding member including the zinc-plated layer subjected to chemical conversion treatment.

The zinc-plated layer subjected to chemical conversion treatment may be formed by a conventional method. In particular, the metal substrate processed into a product state is cleaned and degreased, so that the zinc-plated layer is formed by electroplating thereon. The surface of the zinc-plated layer is then subjected to acid activation with diluted nitric acid, and is impregnated in a chemical conversion treatment liquid (an acidic aqueous solution) containing trivalent chromic acid, so as to obtain the zinc-plated layer with the surface subjected to chemical conversion treatment.

A plating bath for forming the zinc-plated layer by electroplating may be either an acidic bath or an alkaline bath.

Examples of alkaline baths include a cyan-based bath and a zincate-based bath. The zinc plating using a cyan-based bath provides uniform electrodeposition, smoothness, and flexibility of a plated film.

Examples of acidic baths include a chloride bath and a sulfate bath. Specific examples of chloride baths include a zinc ammonium chloride bath, a zinc potassium chloride bath, and a zinc ammonium/potassium chloride bath.

The electroplated layer may be formed by a known plating method, for example, such that metal is precipitated on the surface of the metal substrate, used as a negative electrode, at an appropriate current density in a plating bath containing metallic salt, conductive filler, a hydrogen ion concentration adjuster, an additive, and the like.

The chemical conversion treatment liquid may be a conventionally-used chemical conversion treatment liquid, such as bright chromate, colored chromate, or blue chromate, but is preferably a chromate liquid mainly containing trivalent chromium.

The chemical conversion-treated layer may be formed such that the zinc-plated metal substrate is impregnated in the chemical conversion treatment liquid (chromate liquid) including trivalent chromium.

A chromic acid concentration, temperature, pH, and treatment time of the chemical conversion treatment liquid used for forming the trivalent-chromium chemical conversion-treated layer may be determined as appropriate, but the chromic acid concentration is preferably in a range of 50 g/l to 150 g/l, the treatment temperature is preferably in a range of 20° C. to 50° C., pH is preferably in a range of 1.0 to 3.0, and the treatment time is preferably in a range of 20 to 90 seconds.

The excessively low chromic acid concentration may impede the formation of the chemical conversion-treated layer having a sufficient thickness, while the excessively high chromic acid concentration may decrease the efficiency of forming the chemical conversion-treated layer, leading to a decrease in productivity.

The excessively high temperature may lead to excessive dissolution of the metal substrate, while the excessively low temperature may decrease the reactivity, leading to degradation of appearance.

The excessively high pH may impede the formation of an appropriate chemical conversion-treated layer due to lack of etching, and the insufficient treatment time may impede the formation of the chemical conversion-treated layer having a sufficient thickness, while the treatment time set to longer than 90 seconds may decrease the efficiency of forming the chemical conversion-treated layer, leading to a decrease in productivity.

The method of manufacturing the sliding member according to the present embodiment includes a step of applying an aqueous topcoat layer-coating liquid containing the topcoat layer composition to the surface of the chemical conversion-treated zinc-plated layer and drying it so as to form the topcoat layer.

The step of applying the topcoat layer-coating liquid may be a conventional coating step, such as an impregnation method or a spray coating method, and the impregnation method is particularly preferable since the method facilitates the formation of the topcoat layer with an even thickness.

A concentration of the topcoat layer composition in the topcoat layer-coating liquid is preferably in a range of 5 g/l to 100 g/l, and more preferably in a range of 5 g/l to 35 g/l. The concentration of the topcoat layer composition set in the above range can decrease a viscosity of the topcoat layer-coating liquid, so as to form the thin and smooth topcoat layer.

The manufacturing method preferably includes a step of applying an air blow after applying the topcoat layer-coating liquid by impregnation and before drying. The blowing step blows away an excessive amount of the topcoat layer-coating liquid remaining at the lower edge portion of the sliding member drawn from the topcoat layer-coating liquid, so as to obtain the topcoat layer having a uniform thickness and prevent a drip of the liquid during the drying step, leading to an improvement in operability.

The topcoat layer is preferably heated and dried at a temperature in a range of 60° C. to 100° C. A shorter drying time after the application of the topcoat layer-coating liquid can prevent overgrown crystals and contribute to the formation of the topcoat layer having a uniform thickness.

The method of manufacturing the sliding member according to the present embodiment described above can use a versatile zinc-plating production line only adding the steps of the topcoat layer impregnation and the air blow to a typical zinc-plating production line.

EXAMPLES

Hereinafter, the present embodiment is described in more detail below with reference to examples, but is not limited to the following examples.

<Preparation of Plating Bath>

An acidic plating bath A and an alkaline plating bath B as shown in the following table 1 were prepared.

TABLE 1

|  | Acidic bath A | Alkaline bath B |
| --- | --- | --- |
| Metal zinc | 30 g/L | 13 g/L |
| $NH_4Cl$ | 35 g/L | — |
| NaOH | — | 140 g/L |
| Brightener | 40 g/L | 9 g/L |
| Bath temperature | 28° C. | 30° C. |

<Preparation of Chemical Conversion Treatment Liquid>

The following chemical conversion treatment liquids were prepared:

Organic acid chromate P (Tripass ELV 1500LT, 187396, MacDermid Enthone INDUSTRIAL SOLUTIONS);

Organic acid silica chromate Q (Tripass ELV 7000, 187735, MacDermid Enthone INDUSTRIAL SOLUTIONS); and Blue chromate R (Tripass Blue, 186005, MacDermid Enthone INDUSTRIAL SOLUTIONS).

Table 2 shows the chromic acid concentration, pH, and bath temperature of the respective chemical conversion treatment liquids.

TABLE 2

|  | Organic acid chromate P | Organic acid silica chromate Q | Blue chromate R |
| --- | --- | --- | --- |
| Chromium concentration | 6.3 g/L | 6 g/L | 1.2 g/L |
| pH | 2 | 2.4 | 2 |
| Bath temperature | 28° C. | 28° C. | 28° C. |

<Preparation of Topcoat layer-Coating Liquid>

A silica-based compound ($SiO_2$) (Hydroklad Si: 174439: MacDermid Enthone INDUSTRIAL SOLUTIONS) was dissolved in water so as to prepare a topcoat layer-coating liquid X.

Similarly, a topcoat layer-coating liquid Y containing a silica-based compound ($SiO_2$) (ULTRASEAL: 118639: MacDermid Enthone INDUSTRIAL SOLUTIONS), and a topcoat layer-coating liquid Z containing acrylic resin (Post-dip: 187387: MacDermid Enthone INDUSTRIAL SOLUTIONS) were prepared.

Table 3 shows the concentration, pH, and bath temperature of the topcoat layer composition in the respective coating liquids.

TABLE 3

|  | (X) | (Y) | (Z) |
| --- | --- | --- | --- |
| Composition concentration (g/l) | 100 | 30 | 30 |
| pH | 11.0 | 11.0 | 9.0 |
| Bath temperature (° C.) | 40 | 45 | 28 |

Example 1

A degreased metal substrate (steel material) having a cylindrical stick shape with a diameter of 1 centimeter was impregnated in the acidic bath A with the composition shown in Table 1 for 15 minutes at a current density of 3 $A/dm^2$, and was then washed with water so as to prepare a zinc-plated layer having a thickness of 8 μm.

After being subjected to acid activation with diluted nitric acid, the product was impregnated in the chemical conversion treatment liquid P shown in Table 2 for 45 seconds, and was then drawn out and washed with water so as to prepare a chemical conversion-treated layer having a thickness of 220 nm.

The product was further impregnated in the topcoat layer-coating liquid X shown in Table 3 for 35 seconds, drawn out and blown off by air to blow away the excessive amount of the coating liquid, and then dried in a constant-temperature tank at 80° C. so as to obtain a sliding member to which a topcoat layer of 3.3 $mg/m^2$ was applied.

Example 2

A sliding member of this example was obtained in the same manner as Example 1 except that the product was impregnated in the topcoat layer-coating liquid Y shown in Table 3 for 45 seconds, instead of the topcoat layer-coating liquid X.

Example 3

A sliding member of this example was obtained in the same manner as Example 1 except that the product was impregnated in the topcoat layer-coating liquid Z shown in Table 3 for 30 seconds, instead of the topcoat layer-coating liquid X.

Example 4

A sliding member of this example was obtained in the same manner as Example 1 except that the product was impregnated in the chemical conversion treatment liquid Q shown in Table 2 for 60 seconds, instead of the chemical conversion treatment liquid P, and was then drawn out and washed with water so as to prepare a chemical conversion-treated layer having a thickness of 220 nm.

Example 5

A sliding member of this example was obtained in the same manner as Example 4 except that the product was impregnated in the topcoat layer-coating liquid Y shown in Table 3 for 45 seconds, instead of the topcoat layer-coating liquid X.

Example 6

A sliding member of this example was obtained in the same manner as Example 4 except that the product was impregnated in the topcoat layer-coating liquid Z shown in Table 3 for 30 seconds, instead of the topcoat layer-coating liquid X.

Example 7

A sliding member of this example was obtained in the same manner as Example 1 except that the product was impregnated in the chemical conversion treatment liquid R shown in Table 2 for 30 seconds, instead of the chemical conversion treatment liquid P, and was then drawn out and washed with water so as to prepare a chemical conversion-treated layer having a thickness of 220 nm.

Example 8

A sliding member of this example was obtained in the same manner as Example 7 except that the product was impregnated in the topcoat layer-coating liquid Y shown in Table 3 for 45 seconds, instead of the topcoat layer-coating liquid X.

Example 9

A sliding member of this example was obtained in the same manner as Example 7 except that the product was impregnated in the topcoat layer-coating liquid Z shown in Table 3 for 30 seconds, instead of the topcoat layer-coating liquid X.

Example 10

A sliding member of this example was obtained in the same manner as Example 1 except that the degreased metal substrate was impregnated in the alkaline bath B with the composition shown in Table 1 for 25 minutes at a current density of 3 A/dm$^2$, and was then washed with water so as to prepare a zinc-plated layer having a thickness of 8 μm.

Example 11

A sliding member of this example was obtained in the same manner as Example 10 except that the product was impregnated in the topcoat layer-coating liquid Y shown in Table 3 for 45 seconds, instead of the topcoat layer-coating liquid X.

Example 12

A sliding member of this example was obtained in the same manner as Example 10 except that the product was impregnated in the topcoat layer-coating liquid Z shown in Table 3 for 30 seconds, instead of the topcoat layer-coating liquid X.

Example 13

A sliding member of this example was obtained in the same manner as Example 10 except that the product was impregnated in the chemical conversion treatment liquid Q shown in Table 2 for 60 seconds, instead of the chemical conversion treatment liquid P, and was then drawn out and washed with water so as to prepare a chemical conversion-treated layer having a thickness of 220 nm.

Example 14

A sliding member of this example was obtained in the same manner as Example 13 except that the product was impregnated in the topcoat layer-coating liquid Y shown in Table 3 for 45 seconds, instead of the topcoat layer-coating liquid X.

Example 15

A sliding member of this example was obtained in the same manner as Example 13 except that the product was impregnated in the topcoat layer-coating liquid Z shown in Table 3 for 30 seconds, instead of the topcoat layer-coating liquid X.

Example 16

A sliding member of this example was obtained in the same manner as Example 10 except that the product was impregnated in the chemical conversion treatment liquid R shown in Table 2 for 30 seconds, instead of the chemical conversion treatment liquid P, and was then drawn out and washed with water so as to prepare a chemical conversion-treated layer having a thickness of 220 nm.

Example 17

A sliding member of this example was obtained in the same manner as Example 16 except that the product was impregnated in the topcoat layer-coating liquid Y shown in Table 3 for 45 seconds, instead of the topcoat layer-coating liquid X.

Example 18

A sliding member of this example was obtained in the same manner as Example 16 except that the product was impregnated in the topcoat layer-coating liquid Z shown in Table 3 for 30 seconds, instead of the topcoat layer-coating liquid X.

Example 19

A sliding member of this example was obtained in the same manner as Example 12 except that the degreased metal substrate was impregnated in the alkaline bath B with the composition shown in Table 1 for 25 minutes at a current density of 0.38 A/dm$^2$, and was then washed with water so as to prepare a zinc-plated layer having a thickness of 1 μm.

Example 20

A sliding member of this example was obtained in the same manner as Example 12 except that the degreased metal substrate was impregnated in the alkaline bath B with the composition shown in Table 1 for 25 minutes at a current density of 1.13 A/dm$^2$, and was then washed with water so as to prepare a zinc-plated layer having a thickness of 3 μm.

Example 21

A sliding member of this example was obtained in the same manner as Example 12 except that the degreased metal substrate was impregnated in the alkaline bath B with the composition shown in Table 1 for 25 minutes at a current density of 1.88 A/dm$^2$, and was then washed with water so as to prepare a zinc-plated layer having a thickness of 5 μm.

Example 22

A sliding member of this example was obtained in the same manner as Example 12 except that the degreased metal substrate was impregnated in the alkaline bath B with the composition shown in Table 1 for 25 minutes at a current density of 4.88 A/dm$^2$, and was then washed with water so as to prepare a zinc-plated layer having a thickness of 13 μm.

Example 23

A sliding member of this example was obtained in the same manner as Example 14 except that a chemical conversion treatment liquid Q having a chromic acid concentration of 60 g/l was used so as to prepare a chemical conversion-treated layer having a thickness of 40 nm.

Example 24

A sliding member of this example was obtained in the same manner as Example 14 except that a chemical conversion treatment liquid Q having a chromic acid concentration of 80 g/l and pH of 3.3 was used so as to prepare a chemical conversion-treated layer having a thickness of 40 nm.

Example 25

A sliding member of this example was obtained in the same manner as Example 14 except that a chemical conversion treatment liquid Q having a chromic acid concentration of 60 g/l was used so as to prepare a chemical conversion-treated layer having a thickness of 160 nm.

Example 26

A sliding member of this example was obtained in the same manner as Example 14 except that a chemical conversion treatment liquid Q having a chromic acid concentration of 100 g/l was used so as to prepare a chemical conversion-treated layer having a thickness of 220 nm.

Example 27

A sliding member of this example was obtained in the same manner as Example 14 except that a chemical conversion treatment liquid Q having a chromic acid concentration of 120 g/l was used so as to prepare a chemical conversion-treated layer having a thickness of 220 nm.

Example 28

A sliding member of this example was obtained in the same manner as Example 17 except that the product was impregnated in a topcoat layer-coating liquid Y having a chromic acid concentration of 5 g/l for 45 seconds so as to prepare a topcoat layer with the applied amount of 0.3 mg/m².

Example 29

A sliding member of this example was obtained in the same manner as Example 17 except that the product was impregnated in a topcoat layer-coating liquid Y having a chromic acid concentration of 10 g/l for 45 seconds so as to prepare a topcoat layer with the applied amount of 1.7 mg/m².

Example 30

A sliding member of this example was obtained in the same manner as Example 17 except that the product was impregnated in a topcoat layer-coating liquid Y having a chromic acid concentration of 30 g/l for 45 seconds so as to prepare a topcoat layer with the applied amount of 3.3 mg/m².

Example 31

A sliding member of this example was obtained in the same manner as Example 17 except that the product was impregnated in a topcoat layer-coating liquid Y having a chromic acid concentration of 50 g/l for 45 seconds so as to prepare a topcoat layer with the applied amount of 4.9 mg/m².

Example 32 mA sliding member of this example was obtained in the same manner as Example 17 except that the product was impregnated in a topcoat layer-coating liquid Y having a chromic acid concentration of 70 g/l for 45 seconds so as to prepare a topcoat layer with the applied amount of 7.7 mg/m².

Comparative Example 1

A sliding member of this example was obtained in the same manner as Example 1 except that the topcoat layer was not prepared.

Comparative Example 2

A sliding member of this example was obtained in the same manner as Example 4 except that the topcoat layer was not prepared.

Comparative Example 3

A sliding member of this example was obtained in the same manner as Example 7 except that the topcoat layer was not prepared.

Comparative Example 4

A sliding member of this example was obtained in the same manner as Example 10 except that the topcoat layer was not prepared.

Comparative Example 5

A sliding member of this example was obtained in the same manner as Example 13 except that the topcoat layer was not prepared.

Comparative Example 6

A sliding member of this example was obtained in the same manner as Example 16 except that the topcoat layer was not prepared.

Comparative Example 7

A sliding member of this example was obtained in the same manner as Example 1 except that the chemical conversion-treated layer was not prepared.

Comparative Example 8

A sliding member of this example was obtained in the same manner as Example 2 except that the chemical conversion-treated layer was not prepared.

Comparative Example 9

A sliding member of this example was obtained in the same manner as Example 3 except that the chemical conversion-treated layer was not prepared.

Comparative Example 10

A sliding member of this example was obtained in the same manner as Example 10 except that the chemical conversion-treated layer was not prepared.

Comparative Example 11

A sliding member of this example was obtained in the same manner as Example 11 except that the chemical conversion-treated layer was not prepared.

Comparative Example 12

A sliding member of this example was obtained in the same manner as Example 12 except that the chemical conversion-treated layer was not prepared.

The sliding members obtained in Examples 1 to 32 and Comparative Examples 1 to 12 were evaluated by the following method. In addition, the members only provided by a hot-dip galvanizing were evaluated at the same time.

Table 6 lists the evaluation results of the sliding members, and Table 7 lists the evaluation results of the members only provided by the hot-dip galvanizing.

(Evaluation of Design)

The specular glossiness (60° gloss) on the surface of each sliding member was measured with micro-TRI-gloss available from BYK Gardner.

In addition, the L*a*b* values of the sliding members were measured under the illuminant D65, viewing angle of 10°, and SCI (specular component include) mode with L*a*b* color system Spectrophotometer CM-700d available from KONICA MINOLTA INC. Table 4 lists the evaluation criteria.

TABLE 4

|  | Design | | | |
| --- | --- | --- | --- | --- |
|  | Metallic gloss (Gloss, L) | | Tone (a, b) | |
|  | Gloss | L | a | b |
| AA | Gloss ≥ 220 | L ≥ 91 | |a| < 3 | |b| < 4 |
| A | 170 ≤ Gloss < 220 | 85 ≤ L < 90 | 3 ≤ |a| < 6 | 4 ≤ |b| < 8 |
| NG | Gloss < 170 | L < 85 | |a| ≥ 6 | |b| ≥ 8 |

(Evaluation of Sliding Performance)

The cylindrical circumference of each sliding member was held with a contact surface pressure of 40 MPa, and the power required when the sliding member was pulled out at a sliding speed of 20 mm/s was measured.

AA: Less than 50 N

A: 50 N or greater to less than 60 N

NG: 60 N or greater (Evaluation of Corrosion Resistance)

The time was measured from which 5% of a sodium chloride aqueous solution was sprayed to each sliding member at a temperature of 35° C. to which white rust was caused, according to JIS Z 2371. Table 5 lists the evaluation criteria.

TABLE 5

|  | Corrosion resistance | |
| --- | --- | --- |
|  | White-rust caused time | Red-rust caused time |
| AAA | 400 hours or longer | 550 hours or longer |
| AA | 300 hours or longer to less than 400 hours | 450 hours or longer to less than 550 hours |
| A | 300 hours or longer to less than 400 hours | 350 hours or longer to less than 450 hours |
| NG | less than 200 hours | less than 350 hours |

Figure 2:
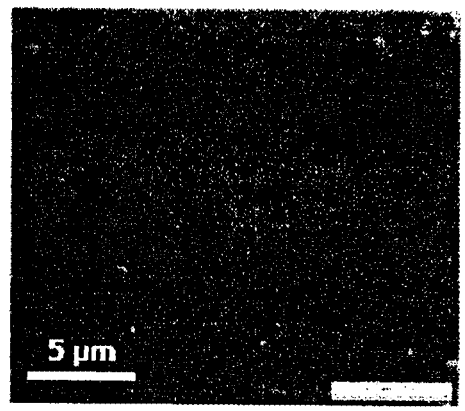
FIG. 2 is an SEM image of a surface of a sliding member of Example 29.
Figure 3:
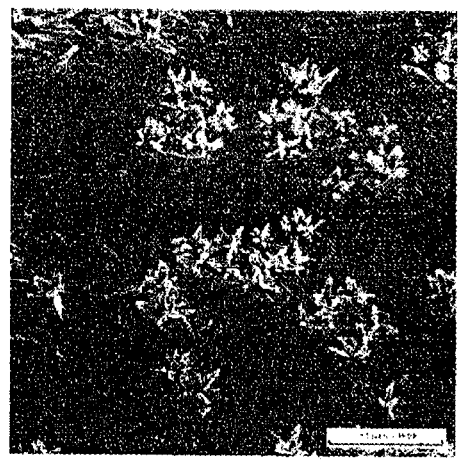
FIG. 3 is an SEM image of a surface of a sliding member of Example 31.

FIG. 2 and FIG. 3 show SEM images of the surfaces of the sliding members obtained in Example 29 and Example 31.

TABLE 6

| | Zinc-plated layer | | | | Chemical conversion-treated layer | | | | | Topcoat layer | | | | | Evaluation | | | |
|---|---|---|---|---|---|---|---|---|---|---|---|---|---|---|---|---|---|---|
| | | | | | Chromic | | | | | | | | | | | | | |
| | Bath type | Zn concentration (g/l) | Current density (A/dm²) | Treatment time (min) | Thickness (μm) | Treatment liquid | acid concentration (g/l) | pH | Treatment time (sec) | Thickness (nm) | Coating liquid | Resin concentration (g/l) | pH | Treatment time (sec) | Drying temperature (° C.) | Applied amount (mg/m²) | Corrosion resistance | Design | Sliding performance | Overgrown crystals of topcoat layer |
| Example 1 | A | 30 | 3 | 15 | 8 | P | 120 | 2.0 | 45 | 220 | X | 100 | 11.0 | 35 | 80 | 3.3 | AA | AA | A | None |
| Example 2 | A | 30 | 3 | 15 | 8 | P | 120 | 2.0 | 45 | 220 | Y | 30 | 11.0 | 45 | 80 | 3.3 | AA | AA | AA | None |
| Example 3 | A | 30 | 3 | 15 | 8 | P | 120 | 2.0 | 45 | 220 | Z | 30 | 9.0 | 30 | 80 | 3.3 | AAA | A | A | None |
| Example 4 | A | 30 | 3 | 15 | 8 | Q | 80 | 2.4 | 60 | 220 | X | 100 | 11.0 | 35 | 80 | 3.3 | AA | AA | A | None |
| Example 5 | A | 30 | 3 | 15 | 8 | Q | 80 | 2.4 | 60 | 220 | Y | 30 | 11.0 | 45 | 80 | 3.3 | AAA | AA | AA | None |
| Example 6 | A | 30 | 3 | 15 | 8 | Q | 80 | 2.4 | 60 | 220 | Z | 30 | 9.0 | 30 | 80 | 3.3 | AA | A | A | None |
| Example 7 | A | 30 | 3 | 15 | 8 | R | 30 | 2.0 | 30 | 220 | X | 100 | 11.0 | 35 | 80 | 3.3 | AAA | AA | A | None |
| Example 8 | A | 30 | 3 | 15 | 8 | R | 30 | 2.0 | 30 | 220 | Y | 30 | 11.0 | 45 | 80 | 3.3 | AA | A | AA | None |
| Example 9 | A | 30 | 3 | 15 | 8 | R | 30 | 2.0 | 30 | 220 | Z | 30 | 9.0 | 30 | 80 | 3.3 | AAA | A | A | None |
| Example 10 | B | 13 | 3 | 25 | 8 | P | 120 | 2.0 | 45 | 220 | X | 100 | 11.0 | 35 | 80 | 3.3 | AA | A | AA | None |
| Example 11 | B | 13 | 3 | 25 | 8 | P | 120 | 2.0 | 45 | 220 | Y | 30 | 11.0 | 45 | 80 | 3.3 | AAA | A | A | None |
| Example 12 | B | 13 | 3 | 25 | 8 | P | 120 | 2.0 | 45 | 220 | Z | 30 | 9.0 | 30 | 80 | 3.3 | AA | A | A | None |
| Example 13 | B | 13 | 3 | 25 | 8 | Q | 80 | 2.4 | 60 | 220 | X | 100 | 11.0 | 35 | 80 | 3.3 | AAA | A | AA | None |
| Example 14 | B | 13 | 3 | 25 | 8 | Q | 80 | 2.4 | 60 | 220 | Y | 30 | 11.0 | 45 | 80 | 3.3 | AA | A | A | None |
| Example 15 | B | 13 | 3 | 25 | 8 | Q | 80 | 2.4 | 60 | 220 | Z | 30 | 9.0 | 30 | 80 | 3.3 | AAA | A | A | None |
| Example 16 | B | 13 | 3 | 25 | 8 | R | 30 | 2.0 | 30 | 220 | X | 100 | 11.0 | 35 | 80 | 3.3 | AA | A | AA | None |
| Example 17 | B | 13 | 3 | 25 | 8 | R | 30 | 2.0 | 30 | 220 | Y | 30 | 11.0 | 45 | 80 | 3.3 | AAA | A | A | None |
| Example 18 | B | 13 | 3 | 25 | 8 | R | 30 | 2.0 | 30 | 220 | Z | 30 | 9.0 | 30 | 80 | 3.3 | AAA | A | A | None |
| Example 19 | B | 13 | 0.38 | 25 | 1 | P | 120 | 2.0 | 45 | 220 | Z | 30 | 9.0 | 30 | 80 | 3.3 | A | A | A | None |
| Example 20 | B | 13 | 1.13 | 25 | 3 | P | 120 | 2.0 | 45 | 220 | Z | 30 | 9.0 | 30 | 80 | 3.3 | A | A | A | None |
| Example 21 | B | 13 | 1.88 | 25 | 5 | P | 120 | 2.0 | 45 | 220 | Z | 30 | 9.0 | 30 | 80 | 3.3 | AA | A | AA | None |
| Example 22 | B | 13 | 4.88 | 25 | 13 | P | 120 | 2.0 | 45 | 220 | Z | 30 | 9.0 | 30 | 80 | 3.3 | AAA | A | A | None |
| Example 23 | B | 13 | 3 | 25 | 8 | Q | 40 | 2.4 | 60 | 40 | Z | 30 | 9.0 | 30 | 80 | 3.3 | A | A | AA | None |
| Example 24 | B | 13 | 3 | 25 | 8 | Q | 40 | 3.3 | 60 | 40 | Y | 30 | 11.0 | 45 | 80 | 3.3 | A | A | AA | None |
| Example 25 | B | 13 | 3 | 25 | 8 | Q | 60 | 2.4 | 60 | 160 | Y | 30 | 11.0 | 45 | 80 | 3.3 | AA | A | AA | None |
| Example 26 | B | 13 | 3 | 25 | 8 | Q | 100 | 2.4 | 60 | 220 | Y | 30 | 11.0 | 45 | 80 | 3.3 | A | A | AA | None |
| Example 27 | B | 13 | 3 | 25 | 8 | Q | 120 | 2.4 | 60 | 220 | Y | 30 | 11.0 | 45 | 80 | 3.3 | AA | A | AA | None |
| Example 28 | B | 13 | 3 | 25 | 8 | R | 30 | 2.0 | 30 | 220 | Y | 5 | 11.0 | 5 | 80 | 0.3 | A | A | AA | None |
| Example 29 | B | 13 | 3 | 25 | 8 | R | 30 | 2.0 | 30 | 220 | Y | 10 | 11.0 | 5 | 80 | 1.7 | A | A | AA | None |
| Example 30 | B | 13 | 3 | 25 | 8 | R | 30 | 2.0 | 30 | 220 | Y | 30 | 11.0 | 5 | 80 | 3.3 | AA | A | AA | None |

TABLE 6-continued

| | Zinc-plated layer | | | | Chemical conversion-treated layer | | | | | | Topcoat layer | | | | | | Evaluation | | | |
|---|---|---|---|---|---|---|---|---|---|---|---|---|---|---|---|---|---|---|---|---|
| | Bath type | Zn concentration (g/l) | Current density (A/dm²) | Treatment time (min) | Thickness (μm) | Treatment liquid | Chromic acid concentration (g/l) | pH | Treatment time (sec) | Thickness (nm) | Coating liquid | Resin concentration (g/l) | pH | Treatment time (sec) | Drying temperature (°C.) | Applied amount (mg/m²) | Corrosion resistance | Design | Sliding performance | Overgrown crystals of topcoat layer |
| Example 31 | B | 13 | 3 | 25 | 8 | R | 30 | 2.0 | 30 | 220 | Y | 50 | 11.0 | 5 | 80 | 4.9 | AA | A | AA | Caused |
| Example 32 | B | 13 | 3 | 25 | 8 | R | 30 | 2.0 | 30 | 220 | Y | 70 | 11.0 | 5 | 80 | 7.7 | AAA | A | AA | Caused |
| Comparative Example 1 | A | 30 | 3 | 15 | 8 | P | 120 | 2.0 | 45 | 220 | — | — | — | — | — | — | NG | NG | NG | — |
| Comparative Example 2 | A | 30 | 3 | 15 | 8 | Q | 80 | 2.4 | 60 | 220 | — | — | — | — | — | — | NG | NG | NG | — |
| Comparative Example 3 | A | 30 | 3 | 15 | 8 | R | 30 | 2.0 | 30 | 220 | — | — | — | — | — | — | NG | A | A | — |
| Comparative Example 4 | B | 13 | 3 | 25 | 8 | P | 120 | 2.0 | 45 | 220 | — | — | — | — | — | — | NG | NG | NG | — |
| Comparative Example 5 | B | 13 | 3 | 25 | 8 | Q | 80 | 2.4 | 60 | 220 | — | — | — | — | — | — | NG | NG | NG | — |
| Comparative Example 6 | B | 13 | 3 | 25 | 8 | R | 30 | 2.0 | 30 | 220 | — | — | — | — | — | — | NG | AA | A | — |
| Comparative Example 7 | A | 30 | 3 | 15 | 8 | — | — | — | — | — | X | 100 | 11.0 | 35 | 80 | 3.3 | NG | AA | A | None |
| Comparative Example 8 | A | 30 | 3 | 15 | 8 | — | — | — | — | — | Y | 30 | 11.0 | 45 | 80 | 3.3 | NG | AA | AA | None |
| Comparative Example 9 | A | 30 | 3 | 15 | 8 | — | — | — | — | — | Z | 30 | 9.0 | 30 | 80 | 3.3 | NG | AA | A | None |
| Comparative Example 10 | B | 13 | 3 | 25 | 8 | — | — | — | — | — | X | 100 | 11.0 | 35 | 80 | 3.3 | NG | A | A | None |
| Comparative Example 11 | B | 13 | 3 | 25 | 8 | — | — | — | — | — | Y | 30 | 11.0 | 45 | 80 | 3.3 | NG | A | AA | None |
| Comparative Example 12 | B | 13 | 3 | 25 | 8 | — | — | — | — | — | Z | 30 | 9.0 | 30 | 80 | 3.3 | NG | A | A | None |

TABLE 7

| Zinc-plated layer | Chemical conversion-treated layer | Topcoat layer | Corrosion resistance | Gloss | Tone | Sliding performance |
|---|---|---|---|---|---|---|
| Hot-dip galvanizing (GA) | None | None | NG | NG | A | NG |
| Hot-dip galvanizing (GI) | None | None | NG | NG | A | NG |

The above test results revealed that Examples including the topcoat layers improve the corrosion resistance and the siding performance, and have silver-colored metallic glossiness with less interference color so as to improve the design, as compared with Comparative Examples 1 to 6.

The results also revealed that, according to the comparison between Examples 1, 2, and 3, the topcoat layer including the silica compound has low sliding resistance and has high sliding performance, and the topcoat layer including the acrylic resin has high corrosion resistance.

The results further revealed that, according to the comparison between Example 29, in which no overgrown crystals are caused on the surface of the topcoat layer, and Examples 31 and 32, in which overgrown crystals are caused, the excessive applied amount of the topcoat layer including the silica compound tends to decrease the design quality with the passage of time.

REFERENCE SIGNS LIST

1 METAL SUBSTRATE
2 ZINC-PLATED LAYER
3 CHEMICAL CONVERSION-TREATED LAYER
4 TOPCOAT LAYER

The invention claimed is:

1. A sliding member comprising, on a surface of a metal substrate, a surface-treated layer comprising a zinc-plated layer, a chemical conversion-treated layer, and a topcoat layer sequentially stacked on the metal substrate,
   the chemical conversion-treated layer including chromium and oxygen,
   the topcoat layer being a clear layer including at least one material selected from the group consisting of a silica compound, acrylic resin, polyurethane resin, epoxy resin, phenol resin, and melamine resin,
   wherein a value of L* is 85 or greater, a value of |a*| is smaller than 6, a value of |b*| is smaller than 8, and a level of metallic gloss is 170 or greater on a surface of the sliding member according to a L*a*b* color system,
   an applied amount of the topcoat layer is 0.3 mg/m$^2$ or greater and 8.0 mg/m$^2$ or less, and
   a thickness of the chemical conversion-treated layer is in a range of 160 nm to 300 nm.

2. The sliding member according to claim 1, wherein a thickness of the zinc-plated layer is in a range of 3 μm to 20 μm.

3. The sliding member according to claim 1, wherein the thickness of the chemical conversion-treated layer is in a range of 160 nm to 220 nm.

4. A method of manufacturing a sliding member comprising, on a surface of a metal substrate, a surface-treated layer comprising a zinc-plated layer, a chemical conversion-treated layer, and a topcoat layer sequentially stacked on the metal substrate,
   the chemical conversion-treated layer including chromium and oxygen,
   the topcoat layer being a clear layer made of at least one material selected from the group consisting of a silica compound, acrylic resin, polyurethane resin, epoxy resin, phenol resin, and melamine resin,
   wherein a value of L* is 85 or greater, a value of |a*| is smaller than 6, a value of |b*| is smaller than 8, and a level of metallic gloss is 170 or greater on a surface of the sliding member according to a L*a*b* color system, and
   wherein the method comprises a step of forming the topcoat layer, on a surface of the chemical conversion-treated layer, and a step of forming the chemical conversion-treated layer before the step of forming the topcoat layer,
   the step of forming the topcoat layer is a process of forming the topcoat layer with an applied amount of 0.3 mg/m$^2$ or greater and 8.0 mg/m$^2$ or less, and
   the step of forming the chemical conversion-treated layer is a process of forming the chemical conversion-treated layer having a thickness in a range of 160 nm to 300 nm.

5. The method of manufacturing the sliding member according to claim 4, wherein the step of forming the topcoat layer includes a process of applying a topcoat layer-coating liquid by impregnation to the metal substrate provided with the zinc-plated layer and the chemical conversion-treated layer, and then applying an air blow.

6. The method of manufacturing the sliding member according to claim 4, further comprising a drying step after the step of forming the topcoat layer.

7. The method of manufacturing the sliding member according to claim 4, further comprising a step of forming the zinc-plated layer on the surface of the metal substrate before the step of forming the chemical conversion-treated layer,
   wherein the step of forming the zinc-plated layer is a process of forming the zinc-plated layer having a thickness in a range of 3 μm to 20 μm by electroplating.

* * * * *